UNITED STATES PATENT OFFICE.

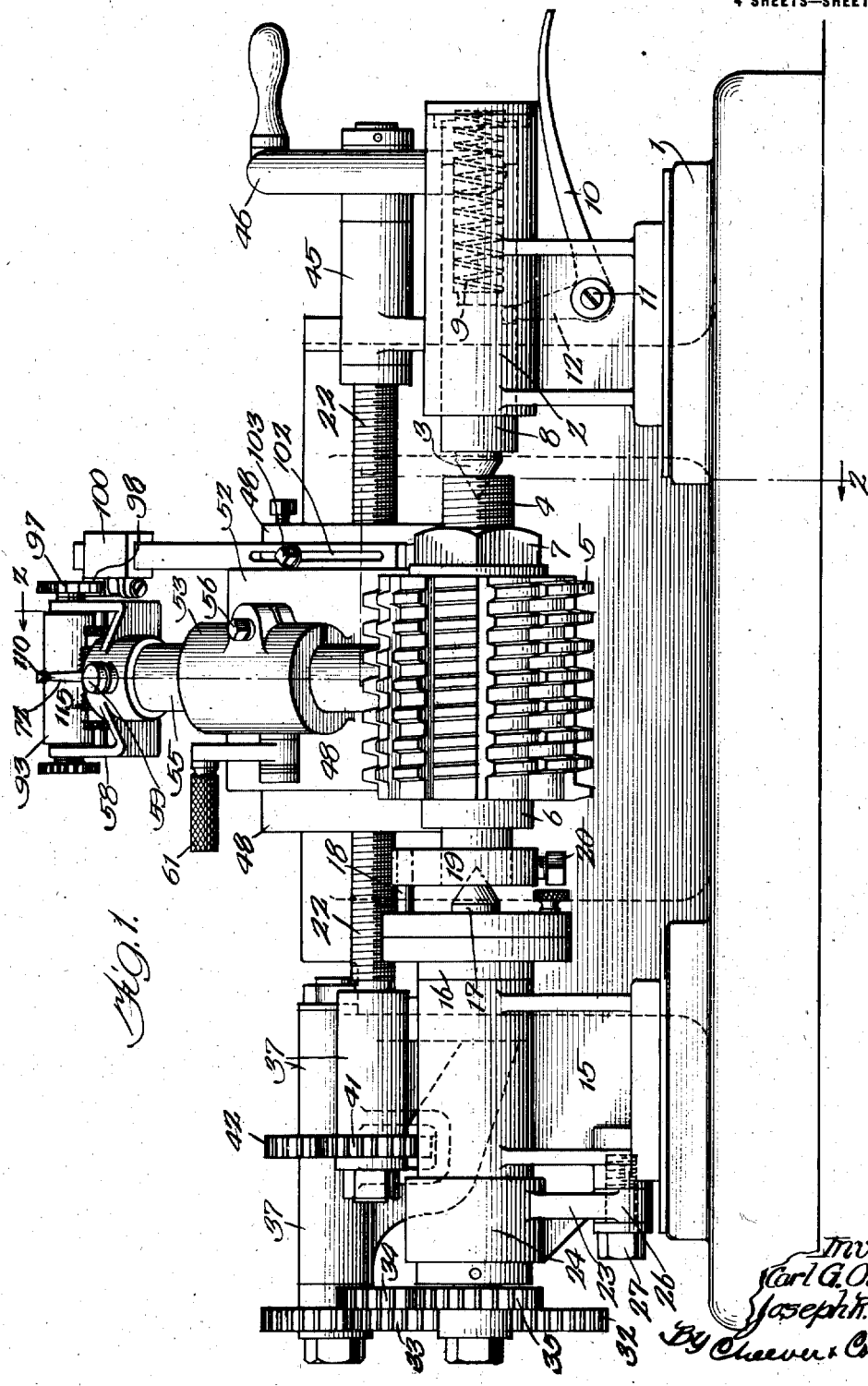

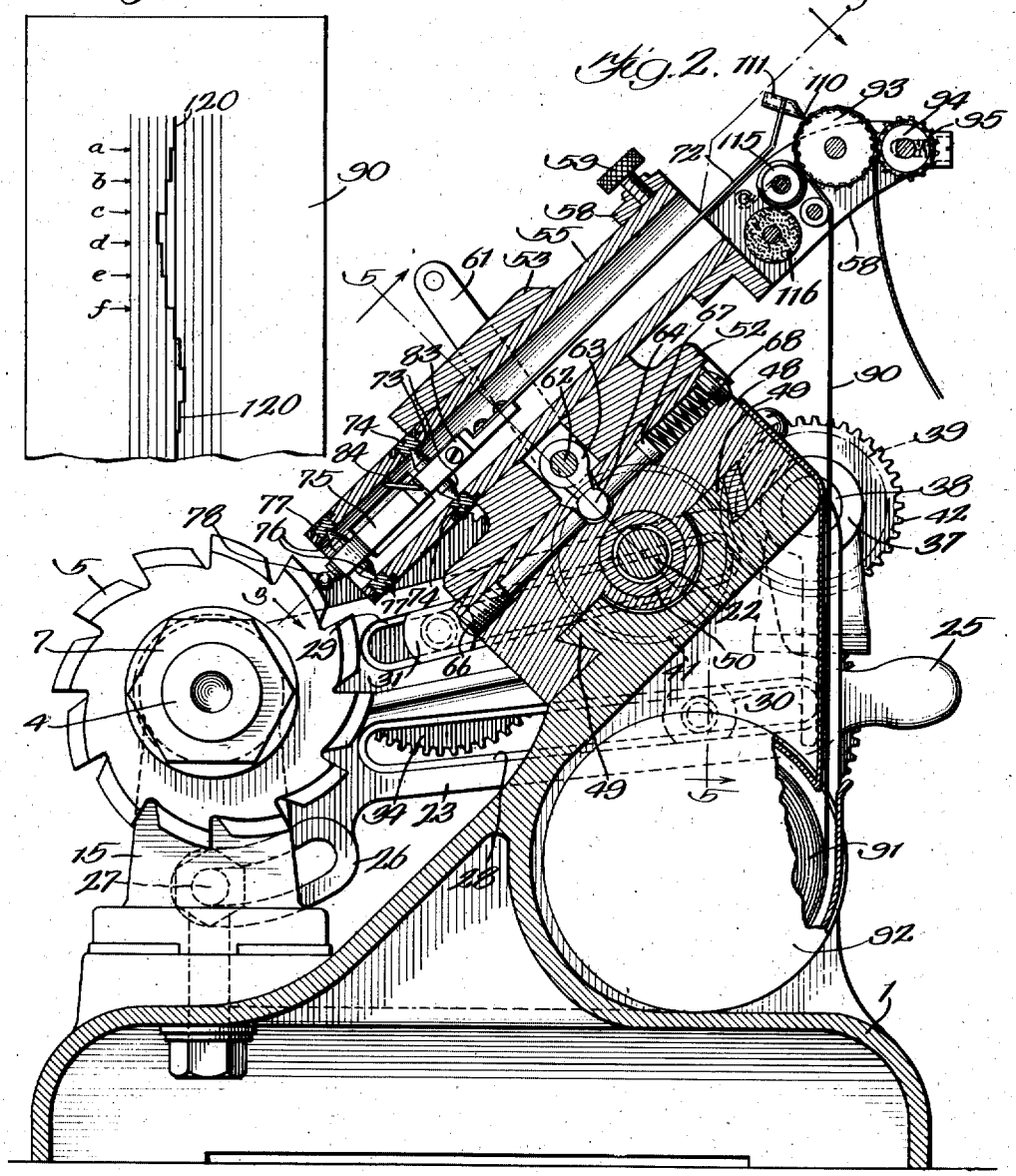

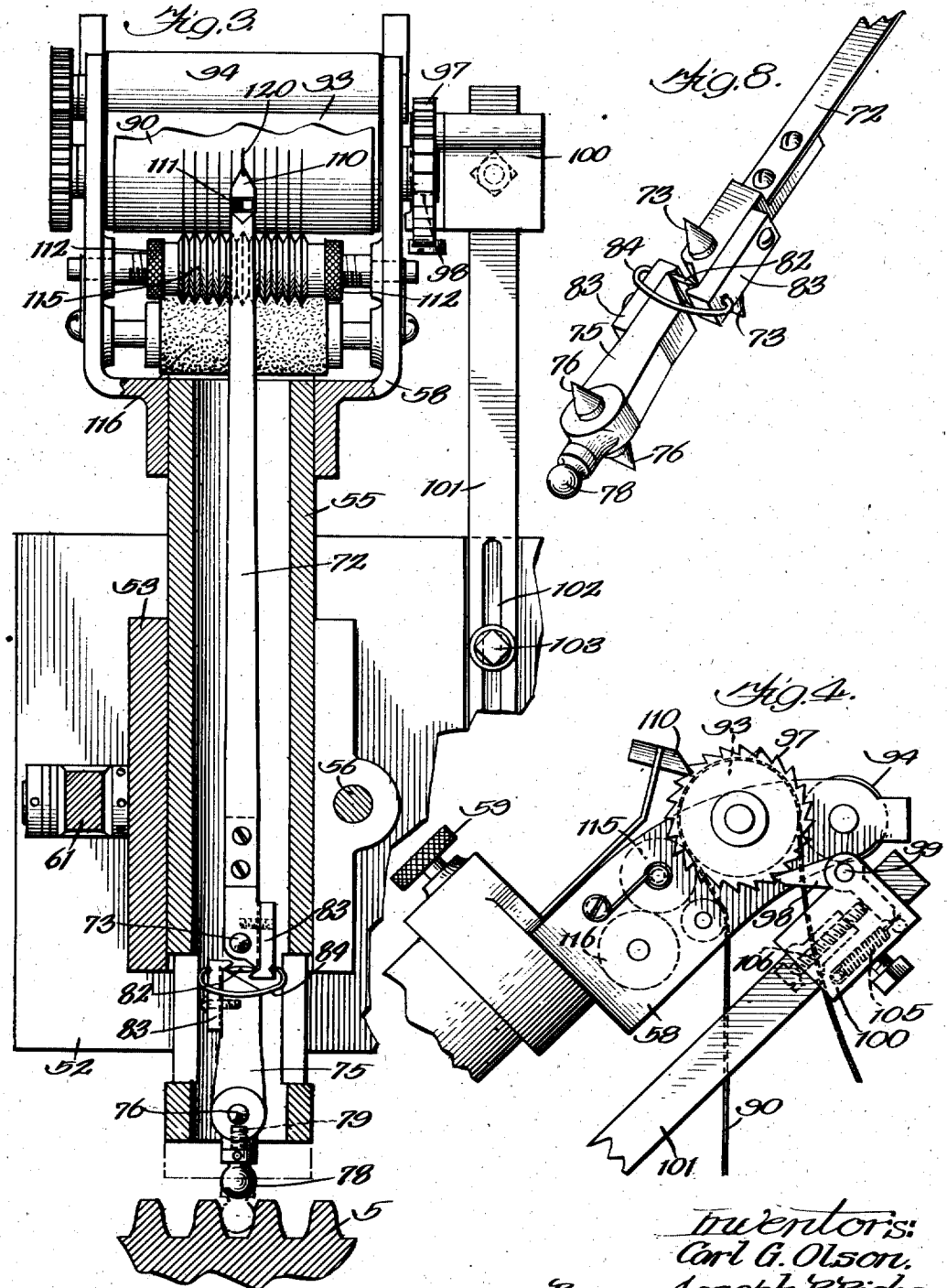

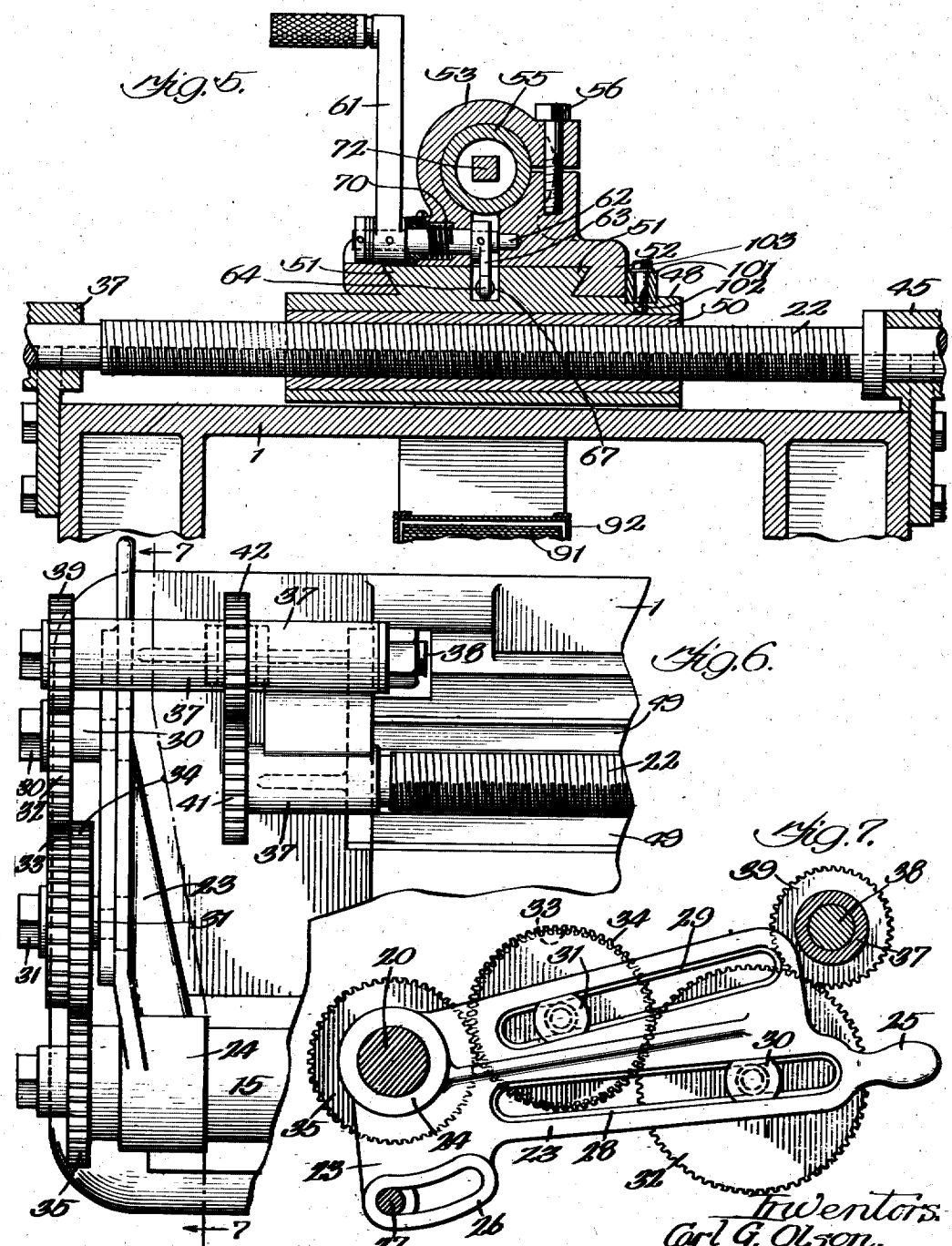

CARL G. OLSON AND JOSEPH R. RICHER, OF CHICAGO, ILLINOIS, ASSIGNORS TO ILLINOIS TOOL WORKS, OF CHICAGO, ILLINOIS, A CORPORATION OF ILLINOIS.

HOB-TESTING MACHINE.

1,254,062.  Specification of Letters Patent.  Patented Jan. 22, 1918.

Application filed March 19, 1917. Serial No. 155,685.

*To all whom it may concern:*

Be it known that we, CARL G. OLSON, a citizen of the United States, residing at Chicago, Cook county, Illinois, and JOSEPH R. RICHER, a subject of the King of Sweden, having declared his intention to become a citizen of the United States, residing in the same city, county, and State, have invented a certain new and useful Improvement in Hob-Testing Machines, of which the following is a specification.

Our invention relates to testing machines, and while it may be used for testing the accuracy of various objects, such as gear wheels and pinions, it is particularly useful for testing the accuracy of hobs used in gear cutting. For the purpose of explaining the invention, we have shown it as in the act of testing a hob. In general the machine consists of an arbor for rotating the hob, a carriage traveling lengthwise of the hob, and a recording indicator mounted on the carriage. The indicator has a record sheet upon which marks are made by a suitable stylus which is operated by an arm, which, in turn, is operated by a contactor which enters between the teeth of the hob and moves the indicator arm to one side or the other of a median line in case there is any inaccuracy in the hob. Means are provided for causing the carriage to travel in accordance with the pitch of the helically arranged teeth of the hob, and other means are provided for bringing the contactor into and out of engagement with the teeth of the hob. Means are also provided for feeding the record sheet and for ruling the record sheet so that the operator may determine on a suitable scale the amount of inaccuracy of the hob. Other means are included which will be duly described. The fundamental object of the invention is to produce a machine capable of carrying out in a practical and efficient manner all or chief of the characteristics and functions mentioned. Ancillary and contributory objects will appear as the description proceeds.

We accomplish our purposes by the mechanism illustrated in the accompanying drawings, in which:

Figure 1 is a general front view of the assembled machine showing a hob in position to be tested.

Fig. 2 is a vertical section of the machine on the line 2—2, Fig. 1.

Fig. 3 is a section of the indicating mechanism taken on the line 3—3, Fig. 2.

Fig. 4 is a side view looking at the right side of the upper portion of Fig. 3.

Fig. 5 is a sectional view taken on the line 5—5, Fig. 2. It shows the lead screw and the carriage which it causes to travel.

Fig. 6 is a top view of one end of the lead screw and of the change speed gear which transmits movement from the lead screw to the hob drive mechanism.

Fig. 7 is a sectional view on the line 7—7, Fig. 6, showing the change speed gearing.

Fig. 8 is a perspective of the contactor, the indicator arm, and their connecting parts.

Fig. 9 shows a fragment of a typical record sheet.

Similar numerals refer to similar parts throughout the several views.

In the form of machine selected to illustrate the invention, the main frame 1 has a tail stock 2 provided with a tail stock center 3 for supporting one end of the arbor 4. The arbor is rotatable and carries the hob 5 which is to be the subject of the test. The construction of the arbor may be varied, but in the present case has a rigid collar 6 at one end which forms an abutment for one end of the hob, and at the other end is threaded for receiving a nut 7 by which the hob is removably held securely upon the arbor. The tail stock slide 8 is longitudinally movable in the tail stock and is normally held projected by a spring 9 shown in dotted lines in Fig. 1. An operating lever 10 for retracting the tail stock center is pivoted upon the pin 11 in the tail stock and has an arm 12, shown in dotted lines in Fig. 1. The free end of this arm engages the tail stock slide for retracting it when the arbor is to be placed or removed.

A head stock 15 is also mounted upon the main frame and carries a spindle 16 which is provided at one end with a head stock center 17 for entering the adjacent end of the arbor 4. The spindle also carries a dog 18 which engages a face plate 19, which is fastened by a set screw 20 or other appropriate means to the arbor. Hence when the spindle rotates, it drives the arbor and with it the hob itself.

The power to drive the spindle of the head stock is furnished by the lead screw 22 through suitable gearing, which is probably best shown in Figs. 1, 6 and 7. In the type of gearing selected for illustrative purpose, a member 23, which may be termed a "quadrant," has a hub 24 which encircles spindle 20 and permits it to rock about it as an axis. The quadrant is provided with a handle 25 by which it may be manipulated. It also has a slotted link 26 which receives a screw stud 27 which screws into the head stock and holds the quadrant in the position to which it may be adjusted. The quadrant has two slotted guides 28 and 29 which support and guide the studs 30 and 31 respectively. The stud 30 forms an axle for the gear wheel 32, while the stud 31 forms an axle for the alternate gear wheels 33 and 34. A gear wheel 35 is rigidly fastened to spindle 20 for rotating it. A lead screw bracket 37 is bolted to the main frame and forms a journal bearing for a counter shaft 38 to which is fastened a gear wheel 39. As suggested in Figs. 6 and 7, the gear wheels 39, 32, 33, 34 and 35 constitute a train for transmitting power from shaft 38 to spindle 20. Any desired speed ratio may be obtained by substituting different size gear wheels in the train. This may be accomplished by temporarily lowering the quadrant, sliding the studs 30 and 31 to proper positions and otherwise proceeding as will be readily understood by those familiar with the use of change speed gearing in ordinary lathes. Power is transmitted from the lead screw 22 to the counter shaft 38 by gear wheels 41 and 42, wheel 41 being fastened to the lead screw and wheel 42 to the counter shaft. The lead screw is journaled at one end in the said bracket 37 and at the other end in a bracket 45, which is bolted or otherwise fastened in the main frame. The lead screw is rotated by means of a hand wheel 46, shown in Fig. 1.

The indicating mechanism proper is mounted in a carriage 48 guided by stationary ways 49, best shown in Fig. 2. These ways are arranged parallel to the axis of the lead screw 22 and arbor 4. A lead screw nut 50 in which the lead screw works is fastened to the carriage 48 with the result that when the lead screw is rotated the carriage is caused to travel in one direction or the other, according to the direction in which the hand wheel is rotated. The carriage has transverse ways 51 for guiding the indicator housing 52. According to the present design, this housing is in the form of a casting having a long boss 53 at the top for guiding the indicator casing 55. This boss is split at one side, and the two parts are held together by a cap screw 56. By tightening or loosening this screw, the amount of friction between the casing and the housing may be regulated.

The indicator casing is a hollow cylinder having a frame 58 at its upper end for carrying the recording mechanism. In the present instance, said frame is bifurcated and held in position by a set screw 59, as best shown in Figs. 1 and 2. The housing 52 is made to slide toward and from the axis of the hob through the agency of a hand lever 61 which is pinned or otherwise fastened to the rock shaft 62 journaled in said housing. A rocker arm 63 is pinned or otherwise rigidly fastened to said rock shaft and has an annular head 64 formed at its outer end, as best shown in Figs. 2 and 5. This head is held between two abutment pieces 66 and 67. One of these, the piece 66, screws into the carriage 48 and hence is adjustable, although otherwise rigidly held in the carriage. The abutment piece 67 is yieldable, being backed up by a compression spring 68. This spring is comparatively strong and does not yield except in cases of emergency. The construction and operation is such that when the hand lever is rotated it produces a corresponding movement in the rock shaft 62 and rocker arm 63. As the head 64 of said arm is, under normal conditions, held fast between its two abutment pieces, it acquires no movement except a rotary one and consequently, the housing 52 is forced to slide up or down on its ways 51. As designed, the operator when he pulls the hand lever down toward him will cause the housing to approach the hob. The housing will be automatically moved away from the hob as soon as the handle is released by a turning spring 70 shown in Fig. 5. This is here shown as a helical spring encircling the rock shaft. One end of the spring is fastened to the rock shaft and the other end to the housing 52.

Within the tubular casing 51 is an indicating arm 72. This arm projects out through the upper end of the casing and near its lower end is pivotally supported by laterally projecting trunnions 73. These parts are shown in perspective in Fig. 8. The trunnions bear in cups 74 which screw into the side of the casing as shown is Fig. 2. An actuating arm 75 is provided with similar trunnions 76 which bear in cups 77 screwing into the side of the casing below the cups 74. At the lower end of the actuating arm is a contactor having in the present case a spherical head 78 and a threaded shank 79 which screws into the lower end of the actuating arm. It is not essential that the head of the contactor be spherical, the idea being that the head shall be of such form as to conveniently fit between the teeth and contact the two adjacent surfaces simultaneously. It will be evident that any lateral displacement of the contactor head will be reflected in a corresponding lateral displacement of the opposite, upper end of the actuating arm 75. Such displacement is transmitted to the indicating arm 72 by a connecting block 82 having at its ends so called "knife edges" for affording line, or, in some cases point, contact with the two arms. The knife edges fit into sockets which, in the instant example, are formed by bars 83 bolted to the arms. The parts are held in engagement by a spring 84 which is here shown in the form of a spring wire clip, the ends whereof engage the backs of the bars. The result is that the arms are always held up close to the connecting block and there is no lost motion. The trunnions or pivotal points on the arms 72 and 75 are so located on said arms that the movement of the upper end of the indicating arm 72 will be much greater than of the head 78. In the form here shown, the ratio of movement is 100 to 1. Thus, an inaccuracy of a one-thousandth of an inch in the hob will produce a displacement of a tenth of an inch at the upper end of the indicating arm.

We will now describe the devices by which a permanent record may be made of the accuracy or inaccuracy of the hob:

A record sheet or strip 90 is stored in a roll 91 in a housing 92, as shown in Fig. 2. The sheet passes over a roller 93 journaled in the branches of the bifurcated indicator frame 58. It then passes down between this roller and another one 94 which is also journaled on frame and creates traction by being constantly urged toward its companion roller by springs 95, shown in dotted line, Fig. 2. If desired, the surface of roller 95 may be covered with blotting paper. By preference, these rollers are geared together to insure feeding of the paper. The record sheet is advanced automatically by mechanism detailed in Figs. 3 and 4. The roller 93 is provided with a ratchet wheel 97 so that when the ratchet is rotated a step the roller will be rotated a corresponding amount. A pawl 98 is fulcrumed on a pin 99 supported on a housing 100 carried at the upper end of a bar 101. This has a slot 102 in its lower portion through which a cap screw 103 passes. The screw taps into the base of the housing 52 and hence adjustably fastens the bar to the housing. As the indicator casing which carries the rollers and ratchet wheel, moves relatively to said housing every time a reading is taken, relative movement between the pawl and the ratchet wheel is thus provided. The pawl is urged toward the ratchet wheel by a spring 105, shown in dotted lines in Fig. 4. The normal position of the pawl is regulated by an adjustable stop 106, which is here shown in the form of a screw. It will be evident that every time the indicator casing descends to bring the contactor into engagement with the hob the ratchet wheel will descend and slip a tooth or two or more (according to the design of the machine) past the pawl. During the return upward movement, the pawl will be in engagement with the wheel and will consequently cause it to rotate as the wheel axis moves up.

The record is produced on the record sheet by a stylus 110 mounted at the upper end of the indicating arm 72. Styluses of various types may be employed, but in the design shown, a fountain stylus is employed having an ink reservoir 111. This device traces a line on the sheet which will have a lateral component in case the contactor head 78 is moved laterally.

A pre-ruled record sheet may be employed if desired, but I have found that greater accuracy may be obtained by placing a ruling device adjacent to the stylus, for by this arrangement, the stylus is correlated with the lines on the sheet and accurate tracking of the sheet is rendered unnecessary. Furthermore, by this arrangement the sheets may vary in width without affecting the accuracy of the record. The ruling devices selected for illustration are best shown in Figs. 2, 3 and 4. They consist of a ruling roller 115, the marking crests whereof are preferably one-tenth of an inch apart. This roller is hollow and held between two adjusting nuts 112, which screw onto a threaded rod 113 supported in the branches of the frame 58. This provides for lateral adjustment of the inking roller so that it will always rule the basic reference line in juxtaposition to the neutral position of the stylus. Adjacent to it, and also journaled in said frame is an inking roller 116. The ruling roller contacts both the inking roller and the surface of the sheet and thus traces parallel reference lines thereon.

In operation, when a test is to be made, the hob is so placed and adjusted on the arbor 4 that when the contactor head 78 is lowered to engage the right end of it, said head will enter squarely between two teeth and when in contact with them, both will hold the indicator arm 72 in central or neutral position so that the stylus 110 will overlie the median or reference line on the record sheet. For illustration, let it be assumed that this reference line is the one identified by the numerals 120, Fig. 9. Let it also be assumed that under these conditions, the stylus will be at the starting station where the arrow at $a$ would intersect the reference line. The machine is now set, it being understood that the operator has previously so selected the change speed gears 32, 33, 34, 35 and 39 that as the hob rotates during the test to present one pair of teeth after another to the indicator, the indicator carriage will keep pace.

When the operator is ready to take a reading, he rotates the hand wheel 46 to bring a new pair of hob teeth beneath the indicator. When this has been done he pulls the indicator lever 61 toward him and causes the contactor to approach the hob. If the hob is accurate at this point, the contactor will suffer no lateral displacement and the stylus will remain accurately on the said reference line 120. The operator then releases the indicator lever and the indicator automatically rises and returns to normal position. During this rise, the pawl 98 is in engagement with the ratchet 97 and causes the rollers 93 and 94 to rotate and advance the paper one step beneath the stylus. As the stylus has not been laterally displaced it will, during this advance of the paper, trace a line coincident with the reference line 120. The paper has now advanced so that the stylus will be opposite to the arrow at $b$, Fig. 9.

The operator then repeats the process, first rotating the hand wheel and lowering the indicator. Let it be assumed that the contactor on this occasion enters between teeth that are faulty in some respect, for example, laterally out of true position, the helical pitch of the hob being too small or too great. The contactor in approaching will be laterally displaced and will produce a corresponding lateral movement of the stylus. Suppose the inaccuracy on the hob to be two and one-half one-thousandths of an inch and that it is such as to produce a movement of the stylus toward the right. The stylus will move across the paper to the second line to the right. When the operator releases the indicator lever and permits the indicator to rise, the paper will have had traced upon it by the stylus a vertical line located between the second and third ruled lines to the right of the reference or median line 120, as shown in Fig. 9. This line will reach to a point opposite the arrow at $c$. Thus, a graphic record is produced, and by building the parts to scale and inking the paper to scale, the operator will be able to determine at a glance at what points and to what extent, if any, the hob is inaccurate.

It may be that in some cases the contactor descends on the top of a tooth, or, for other reason, downward movement of the indicator is obstructed. In such event, the operator in pulling down upon the indicator lever 61 will not wreck or strain the parts, for the spring 68 will permit the abutting piece 67 to yield and permit the lever to rock without producing a corresponding movement in the indicator casing 55.

It will be seen from the foregoing that the machine makes an accurate record of the formation of a hob and performs its work in efficient and simple manner.

We claim as our invention:

1. A hob testing machine having hob supporting means adapted to rotate the hob, a contactor having a rounded head, an indicator arm actuated by said contactor, and a support whereon said contactor and arm are mounted to move rectilinearly in a direction substantially toward and from the axis of the hob whereby the said rounded head may be caused to enter between two hob teeth and contact both of them simultaneously.

2. A machine for testing hobs and the like, comprehending means for rotatably supporting the hob, a carriage traveling past it, an indicator on said carriage and means for causing said carriage to travel in harmony with the lead of the helically arranged hob teeth.

3. A hob testing machine, consisting of an arbor for rotatably supporting the hob, an indicator carriage traveling past it, indicating mechanism on said carriage movable toward and from the hob, and a lead screw for causing the carriage to travel, said lead screw being geared to the arbor for making the carriage keep pace with the helically progressing teeth of the hob.

4. A hob testing machine, consisting of an arbor for rotatably supporting the hob, an indicator carriage traveling past it, indicating mechanism on said carriage movable toward and from the hob, said indicating mechanism having an indicator arm and a contactor for actuating said arm, said contactor having a rounded head for entering between two adjacent hob teeth and contacting them both simultaneously, and a lead screw for causing the carriage to travel, said screw being geared to said arbor.

5. A machine for testing toothed objects having means for supporting the object to be tested, a contactor having a rounded head for entering between and simultaneously contacting two of the teeth of said object, an indicator arm actuated by said contactor, a housing for supporting said contactor and arm, and controlling means for moving said housing toward and from said object, said controlling means including an arm connected at one end to said housing and at the other end held at a fixed distance from the object to be tested.

6. A hob testing machine having means for supporting the hob, a traveling carriage, indicator mechanism on said carriage comprising an indicator arm and a contactor for actuating it, said contactor being adapted to contact the teeth of the hob, supporting means for the contactor, an indicator arm movable on the carriage toward and from the hob, and controlling means for moving said supporting means toward and from the hob, said controlling means including an arm connected at one end to the carriage and at the other to the said supporting means.

7. A hob testing machine having means for supporting the hob, a traveling carriage, indicator mechanism on said carriage comprising an indicator arm and a contactor for actuating it, said contactor being adapted to contact the teeth of the hub, supporting means for the contactor, an indicator arm movable on the carriage toward and from the hob, controlling means for moving said supporting means toward and from the hob, said controlling means including an arm connected at one end to the carriage and at the other end to the said supporting means, and a spring for urging said arm to move the supporting means away from the hob.

8. A hob testing machine having means for supporting the hob, a carriage traveling past it parallel to its axis, a tubular casing supported upon said carriage and movable toward and from the hob, an indicator arm having trunnions bearing on the inside of the casing, and a contactor having trunnions also bearing on the inside of the casing, said contactor having a head adapted to contact the teeth of the hob, said contactor and indicating arm being connected together whereby motion of one is transmitted to the other.

9. A hob testing machine having means for supporting the hob, a carriage traveling parallel to the hob axis, indicating mechanism on said carriage movable toward and from the hob, and controlling means for thus moving the indicating mechanism, said controlling means comprising a hand operated arm articulately connected at one end to the indicating mechanism and at the other end to the carriage.

10. A hob testing machine having means for supporting the hob, indicating mechanism movable toward and from the hob, a carriage for supporting said indicating mechanism, said carriage traveling parallel to the axis of the hob, and controlling means for moving the indicating mechanism toward and from the hob, said controlling means comprising an arm articulately connected at one end to the indicating means and at the other end to the carriage, the connection at one end of said arm being yieldable when subjected to unusual strain.

11. A hob testing machine having means for supporting the hob, indicating mechanism movable toward and from the hob, a carriage for supporting said indicating mechanism, said carriage traveling parallel to the axis of the hob, and controlling means for moving the indicating mechanism toward and from the hob, said controlling means comprising an arm pivoted at one end to the indicating means and at the other end held between two abutment pieces mounted in the carriage, one of said abutment pieces being yieldable when subjected to unusual strain.

12. A hob testing machine having means for supporting the hob, indicating mechanism movable toward and from the hob, a carriage for supporting said indicating mechanism, said carriage traveling parallel to the axis of the hob, and controlling means for moving the indicating mechanism toward and from the hob, said controlling means comprising an arm pivoted at one end to the indicating means and at the other end held between two abutment pieces mounted in the carriage, one of said abutment pieces being yieldable when subjected to unusual strain and the other of said pieces being adjustable in the carriage in a direction toward and from the yieldable abutment piece.

13. A hob testing machine having means for supporting the hob, a carriage traveling parallel to the hob axis, indicating mechanism mounted on said carriage and movable toward and from the hob, a hand operated rock shaft journaled in said indicating mechanism, a rocker arm rigidly fastened to said shaft, a yieldable abutment piece mounted in said carriage in position to engage the free end of said rocker arm, and a second abutment piece screwing into said carriage in line with the yieldable abutment piece and engaging the opposite side of the free end of the rocker arm.

14. In a machine for testing the accuracy of configurated objects, a main frame for supporting the object to be tested, an indicating arm having a contactor for actuating it, movable controlling means supported on said main frame for moving said contactor toward and from the object to be tested, a record sheet, a stylus on said arm for marking said sheet, a roller on said controlling means for advancing said sheet, and means, part of which is connected to the roller and part to the movable controlling means for advancing the roller every time the controlling means completes a cycle in moving the contactor toward and from the object to be tested.

15. In a machine for testing the accuracy of configurated objects, a main frame for supporting the object to be tested, an indicating arm having a contactor for actuating it, movable controlling means supported on said main frame for moving said contactor toward and from the object to be tested, a record sheet, a stylus on said arm for marking said sheet, a roller on said controlling means for advancing said sheet, a ratchet wheel connected to said roller for rotating it and advancing the record sheet, and a pawl supported upon the main frame and coöperating with said ratchet for rotating it and the roller every time the controlling means makes a round trip.

16. In a hob testing machine, a main frame for supporting the hob, an indicating arm having a contactor for actuating it, movable controlling means supported on said main frame for moving said contactor toward and from the hob, a record sheet, a stylus on said arm for marking said sheet, a roller on said controlling means for advancing said sheet, a pawl carried by said main frame for rotating the ratchet, and an adjustable stop for regulating the normal position of said ratchet.

17. In a hob testing machine, a main frame for supporting the hob, an indicating arm having a contactor for actuating it, movable controlling means supported on said main frame for moving said contactor toward and from the hob, a record sheet, a stylus on said arm for marking said sheet, a roller on said controlling means for both supporting the record sheet beneath the stylus and advancing said sheet, and a pawl carried by said main frame for rotating the ratchet.

18. A hob testing machine comprising a main frame for supporting the hob, an indicating arm having a contactor for actuating it, movable controlling means supported on said main frame for moving said contactor toward and from the hob, a record sheet, a stylus on said arm for marking said sheet, a roller mounted on said controlling means for advancing said sheet, a ratchet wheel for actuating said roller, a pawl coöperating with said ratchet for actuating it, and a bar adjustably supported upon the main frame for regulating the normal position of the pawl, to thereby permit the machine to accommodate hobs of different sizes.

In witness whereof we have hereunto subscribed our names.

CARL G. OLSON.
JOSEPH R. RICHER.